(12) United States Patent
Flint et al.

(10) Patent No.: US 6,745,910 B2
(45) Date of Patent: Jun. 8, 2004

(54) MOUNTING BLOCK ASSEMBLY FOR ELECTRICAL INTERCONNECTION BETWEEN RAIL CARS

(75) Inventors: Kip P. Flint, Castorland, NY (US); Johnny L. Burch, Natural Bridge, NY (US); Gene A. Timourou, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/425,884

(22) Filed: Apr. 30, 2003

(65) Prior Publication Data

US 2003/0192850 A1 Oct. 16, 2003

Related U.S. Application Data

(62) Division of application No. 09/933,707, filed on Aug. 22, 2001, now Pat. No. 6,581,791.

(51) Int. Cl.[7] ................................................ B61G 5/00
(52) U.S. Cl. ...................... 213/1.3; 213/75 GT; 213/76
(58) Field of Search ...................... 213/1.3, 1.6, 75 GT, 213/76; 439/34, 35, 449, 460, 461, 469, 470, 574, 575, 576, 192, 376, 191, 288

(56) References Cited

U.S. PATENT DOCUMENTS

| | | | |
|---|---|---|---|
| 1,123,074 A | * 12/1914 | Bliss | ........................... 439/376 |
| 1,263,520 A | 4/1918 | Brown | |
| 1,276,216 A | 8/1918 | Hawthorne | |
| 1,592,012 A | * 7/1926 | Stafford | ...................... 439/192 |
| 1,750,633 A | 3/1930 | Farmer | |
| 1,856,455 A | 5/1932 | Banks et al. | |
| 3,402,382 A | 9/1968 | De Tar | |
| 3,696,758 A | 10/1972 | Godinez, Jr. | |
| 3,812,444 A | * 5/1974 | Reno | ........................... 439/191 |
| 3,895,850 A | * 7/1975 | Engle et al. | ................... 439/34 |
| 4,017,136 A | 4/1977 | Sasgen | |
| 4,301,932 A | 11/1981 | Altherr | |
| 4,892,204 A | 1/1990 | Lumbis | |
| 4,986,500 A | 1/1991 | Campbell | |
| 5,281,761 A | 1/1994 | Woo et al. | |
| 5,586,668 A | 12/1996 | Miller | |
| 5,833,482 A | * 11/1998 | Buchter | ...................... 439/288 |
| 5,888,104 A | 3/1999 | Mello et al. | |
| 5,980,289 A | 11/1999 | Engle | |
| 6,173,849 B1 | 1/2001 | Stevens et al. | |
| 6,581,791 B2 | * 6/2003 | Flint et al. | .................... 213/1.3 |

* cited by examiner

Primary Examiner—Mark T. Le
(74) Attorney, Agent, or Firm—Barnes & Thornburg LLP

(57) ABSTRACT

An end of car mounting block assembly for electrical interconnections between rail cars. The assembly includes a housing having an opening therethrough adapted to receive an electrical plug and an electrical cable.

12 Claims, 8 Drawing Sheets

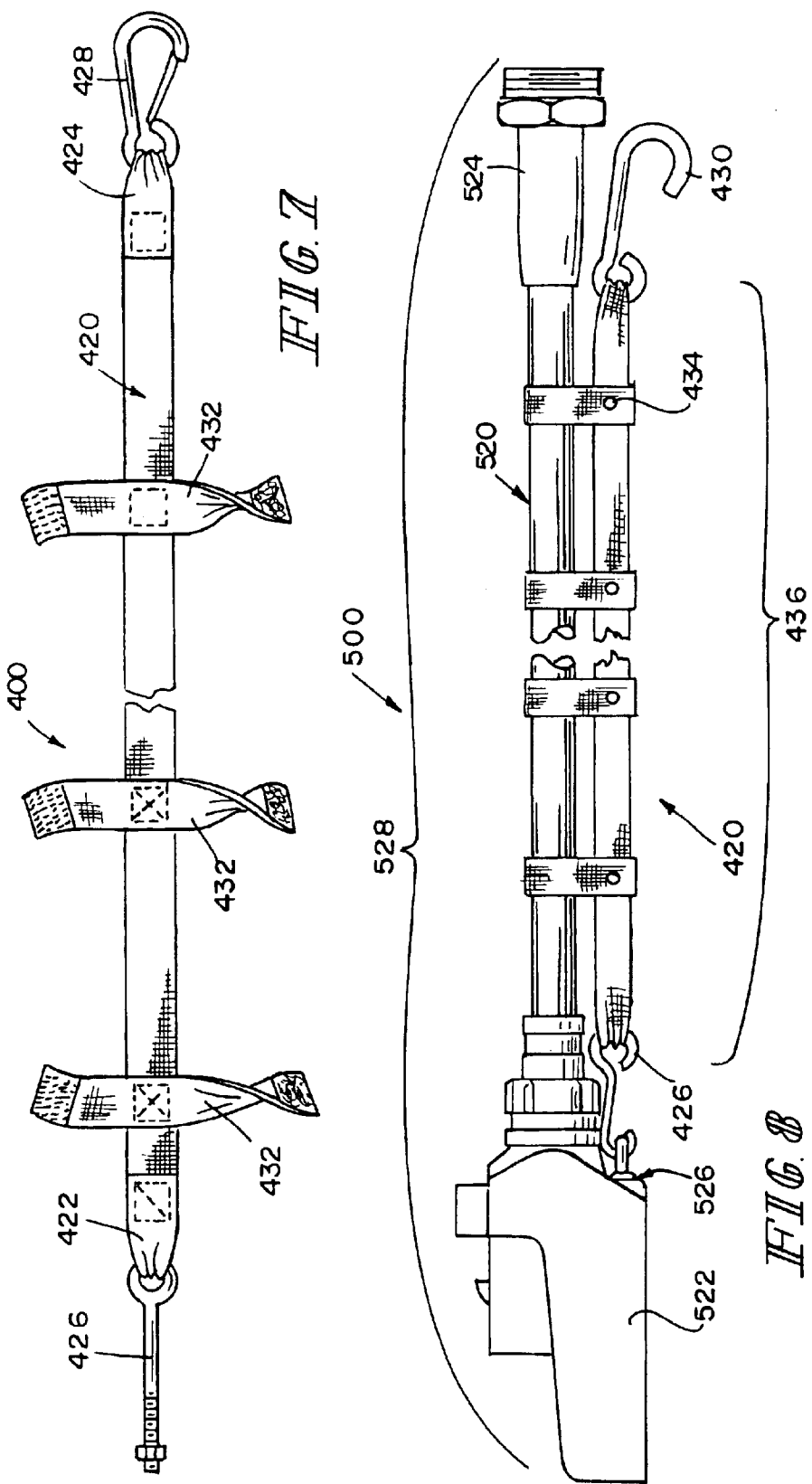

MOUNTING BLOCK ASSEMBLY FOR ELECTRICAL INTERCONNECTION BETWEEN RAIL CARS

This application is a divisional of application Ser. No. 09/933,707, filed on Aug. 22, 2001, now U.S. Pat. No. 6,581,791.

BACKGROUND AND SUMMARY OF THE INVENTION

The present invention relates to a rail car mounting block assembly for electrical interconnections between railway cars and to a lanyard for receiving an electrical cable with the lanyard connecting to the assembly. It also relates to the lanyard in combination with the cable.

Today's railroad trains are equipped with air brakes and the trains' cars are provided with air brake pipes that terminate at the end of each rail car. The pipes have air hoses that connect to the pipes at the end of each car and extend or hang between each car. The combination of pipes and hoses carry compressed air to operate the brakes on each car. The flow of compressed air is controlled by valves mounted on the brake pipes at each end of each car. The air hoses that hang from each end-of-car brake pipe are joined between the cars by what is known as a "gladhand". To prevent the hoses themselves and the gladhands from swaying too much or to prevent them from touching the tracks, there have been field fixes comprised of wires or chains that are hooked or connected to the gladhand and various parts of the rail car to attempt to prevent the air hoses from hitting the ground.

Likewise, freight trains may have electrical cables that also run along each car and from car to car. The electrical cable connections are also mounted at the end of each car (usually at junction boxes) and their cables have restraining wires and chains similar to those used with the air hoses. This results in additional wires and chains dangling from the end of each car and between the cars.

The air hose connection (the valve) at the end of each rail car and the electrical connection (the junction box) at the end of each car are not co-located. Attempts to restrain the hoses and cables between cars has resulted in a hodgepodge of field solutions that have failed to satisfactorily prevent cable and hose entanglements or damage or even outright breakage of the hoses, cables and connections.

The problem is compounded by the fact that the differing lengths of the electrical cables used to connect the electrical system between rail cars has resulted in sporadic and ineffective field solutions to restrain and protect them. Thus, the number and types of restraining ropes, chains, wires, etc has proliferated, but not solved the problem.

Further compounding the problem is the situation where the air hoses and cables are on rail cars that are used for rotary dumping. In this mode, there is more of a tendency for the air hose and the electrical cables to get tangled and twisted, resulting in the aforementioned damage to hoses, cables and connections and a potentially unsafe condition.

The present invention is designed for applicability to all types of rail vehicles including transit, freight and highway/rail.

The present invention provides for a mounting block assembly for electrical interconnections between rail cars. The mounting assembly comprises a housing having a threaded opening therethrough adapted to receive an electrical plug and electrical cable. The assembly has a securing mechanism for attaching the housing to a rail car and the housing also has a receiving means for receiving a connector of a lanyard. The invention further provides for a lanyard having a plurality of loops for receiving an electrical cable with electrical connectors at both ends. The lanyard itself also has connectors at both ends with one of those connectors attaching to one of the cable's electrical connectors and the other connector attaching to the receiving means of the housing. The invention further provides for a combination of the lanyard and the electrical cable.

The mounting block assembly has four preferred embodiments that relate first, to the way the housing is structured and second, to the way the housing is attached to a rail car. In one embodiment, the housing has an arcuate frictional surface formed as a portion of a surface of the housing wherein the securing mechanism can be a C-clamp. The C-clamp, which may or may not have an arcuate frictional surface, secures the housing to an air valve pipe or a connector or equivalent structure in a position juxtaposed the arcuate frictional surface of the housing. This preferred embodiment has two related versions wherein the housing has its arcuate frictional surface formed as a portion of either the top or the side surface of the housing and wherein the securing mechanism may be at least one U-bolt in either or both versions. The least one U-bolt secures the housing to the air valve pipe or connector or equivalent structure juxtaposed the arcuate frictional surface of the housing.

It should be noted that the housing for the above-referenced preferred embodiments may have an arcuate surface that is not corrugated or have other frictional surface attributes.

In a second preferred embodiment, the securing mechanism includes a plurality of bolts that secures the housing to a mounting plate adjacent a rail car's air valve located at the end of a rail car.

In a third preferred embodiment, the securing mechanism for securing the housing to a rail car includes making the housing and a rail car's brake pipe air valve as a monolithic unit, such as casting, that is located and mounted at the end of a rail car.

For all preferred embodiments, the housing's means for receiving the connector of a lanyard could, if desired, be a threaded eyebolt or a snap-pin and ring or equivalent securely attached through an opening in the housing. The means could also be, if desired, a ring or equivalent receiving means with the means and the housing made as a monolithic unit, by a method such as casting.

The mounting block assembly housing could, if desired, have a single or a plurality of threaded tubes, nuts, bushings and sleeves to provide support for an electrical cable and to provide a strain relief mechanism for a connected electrical cable. The housing could also have a restraining device to prevent movement of an electrical plug that is threadably inserted into the opening of the housing.

The opening of the housing can be threaded or not and can, if desired, be independent of a rail car's air hose or of its brake pipe.

The present invention further provides for a lanyard for an electrical cable. The lanyard comprises a strap made of a continuous piece of material of a fixed length having first and second ends. The lanyard also has a plurality of loops, adapted for receiving the cable, the loops being located along the length of and extending outwardly from the strap. A first connector is attached at one end of the strap and a second connector is attached at the other end of the strap.

The lanyard could, if desired, be made of a cloth of manmade fibers such as KEVLAR polypropylene, nylon and polyester. The loops can, if desired, be made of a cloth of man-made fibers such as KEVLAR, polypropylene, nylon and polyester. The loops can be of a fixed circumferential length or the loops could be openable and made of, for instance, hook and loop material or other adjustable mechanisms or materials such that the loop's circumference is fixed or adjustable. The loops can, if desired, be attached to the strap by sewing, riveting, adhesive bonding, ultra sonic welding or other equivalent attaching means.

The lanyard's first connector can, if desired, be a threaded eyebolt, hook, clip, clasp, split ring, snap or equivalent for attaching to an electrical cable connector receptable. The lanyard's second connector could, if desired, be an open hook, split ring hook, crab-claw hook, snap-closing hook, or equivalent. The lanyard could, if desired, be capable of withstanding a pull of up to 500 pounds and shock force of up to 1000 pounds.

The invention further provides for a lanyard in combination with an electrical cable comprising an electrical cable of a first length having first and second ends with first and second electrical connectors attached at the first and second ends, respectively. The first electrical connector has a receptable for receiving a connector. The lanyard is comprised of a strap of a second length having first and second ends with first and second connectors attached at those ends, respectively. The strap has a plurality of loops along the length of and extending outwardly from the strap wherein portions of the electrical cable are encompassed by the loops. The first connector is attached to the receptable on the first electrical connector.

The lanyard can be further comprised, if desired, as previously described herein, regarding the material of the strap and loops, the attachment of the loops to the strap and the structure of the first and second connectors. Also, the first length (of the cable) can, if desired, be longer than the second length (of the strap). The lanyard, can, if desired, provide load relief when there is a pulling apart force between train cars, thereby preventing stress on the first electrical connector.

Other aspects of the present invention will become apparent from the following detailed description of the invention when considered in conjunction with the accompanying drawings.

BRIEF DESCRIPTION OF THE DRAWINGS

FIG. 7 is a plan view of a lanyard, according to the principles of the present invention.

FIG. 8 is a plan view of a lanyard and electrical cable in combination, according to the principles of the present invention.

DETAILED DESCRIPTION OF THE PREFERRED EMBODIMENTS

Generally, the mounting block assembly invention is comprised of a housing having a threaded hole that receives an electrical plug and electrical cable that is part of the electrical system that carries the electricity and communications from rail car to rail car through am entire train. The assembly also has a receiving means, in the form of a ring or hook, that is adapted to receive a connector such as a hook or clasp from a lanyard. The housing also has a securing means, which, in one embodiment, may be one or more U-bolts or a C-clamp that enable the housing to be secured, for example, around and to an air valve pipe. The air valve pipe, which is mounted at the end of each rail car, has an air hose connected to it. This combination of air valves and hoses on each rail car carries the compressed air that operate the train's brakes.

In another embodiment, the housing can also be secured to the end of a rail car by mounting it to a mounting plate on the rail car adjacent to the air valve or in a further embodiment, by casting it as an integral part of the air valve itself.

The lanyard aspect of the invention comprises a strap of a fixed length with a plurality of loops positioned along and extending from the strap. The loops can be of fixed or adjustable circumferential length and are adapted to encompass the aforementioned electrical cable that extends between rail cars. The lanyard has a connector at each of its ends, with one of those connectors attaching to the mounting block housing and the other attaching to a receptable in an electrical connector at one end of the electrical cable.

Another part of the invention is the combination of the lanyard and the electrical cable. When the length of the lanyard's strap is shorter than the length of the electrical cable, the lanyard is able to restrain the cable's movement, reduce its swaying and its potential to tangle or hit the ground. The combination also provides strain relief for the electrical cable itself in case there is a pulling apart of the train's cars.

The embodiments of the mounting block assembly described herein will use the same reference numbers for common elements that have the same function.

Figure 1:
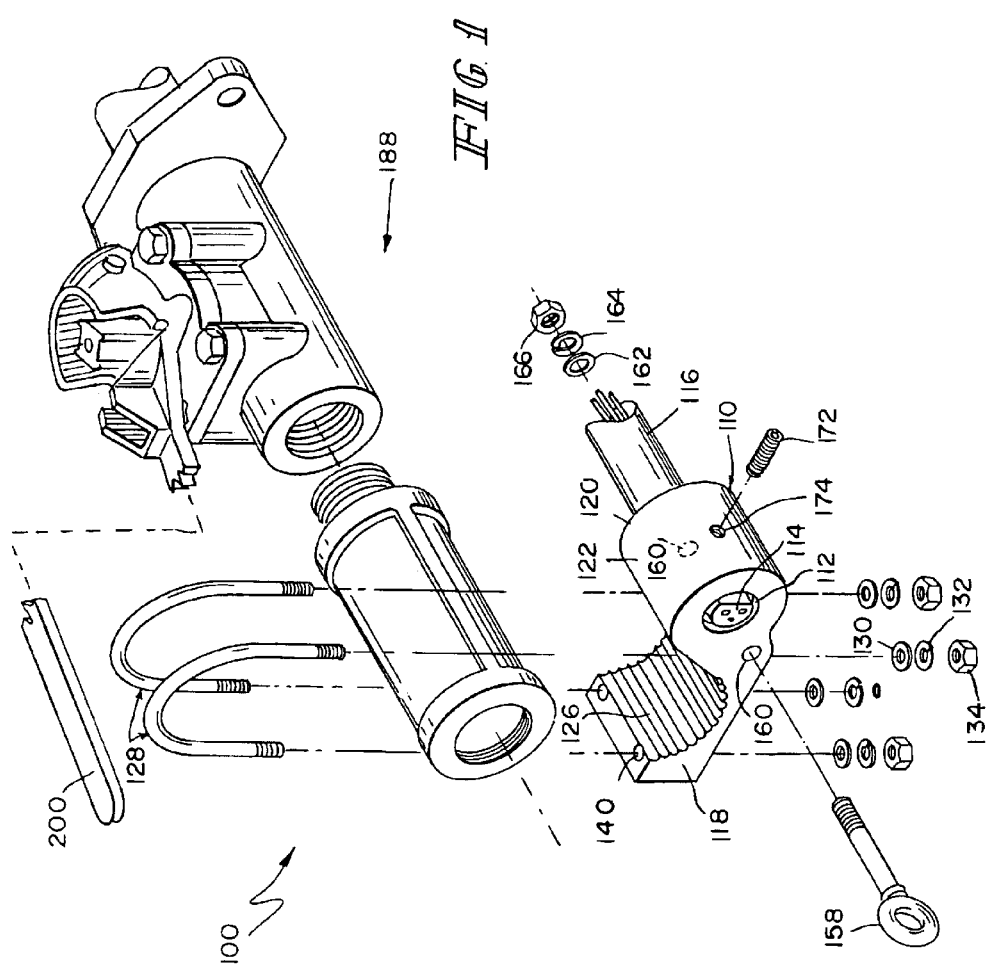
FIG. 1 is an exploded view of an embodiment of a mounting block assembly where U-bolts extend through openings in the top surface of the housing, according to the principles of the present invention.

A particular embodiment of the mounting block assembly 100 is shown in FIG. 1. The housing 110 has as threaded opening 112 adapted to threadably receive an electrical plug 114. An electrical cable 116 is attached to the plug 114 which is located in opening 112 and is protected by the housing 110. The electrical cable 116 extends from the rear of the housing 110 to a junction box on the rail car (not shown). The electrical plug 114 is adapted to receive the male end of an electrical connector 524 that is integral to an electrical cable 520 (see FIGS. 8 and 9)(the detailed connection of the plug and connector is not shown). The connection of plug 114 and connector 524 are part of the electrical interconnection between rail cars. The electrical plug 114 is held securely in place by a restraining device, shown as a set screw 172, inserted through the set screw opening 174 in the housing 110.

The housing 110 is secured to, for instance, a portion of a brake pipe air valve by a securing means. As shown in FIG. 1, the means may include one or more U-bolts 128 through holes 140 in the top surface 122 of the housing 110. The U-bolts 128 are secured to the housing 110 by washers 130, lock washers 132 and nuts 134. The housing 110 may have an arcuate frictional surface 126 formed as part of the top surface 122 of the housing 110 to provide additional security through resistance to the movement of the housing 110 when it is secured to a portion of a brake pipe air valve 188. The housing 110 also has receiving means which could be an open or closed hook, bolt or ring and shown as an eyebolt 158 adapted to receive a connector from a lanyard 400 (see also FIG. 7). The eyebolt 158 is attached to the housing 110 by inserting the eyebolt 158 through the bolt opening 160 on the front surface 118 of the housing 110 and having it emerge through the rear surface 120 of the housing 110 where it is secured by a bolt washer 162, bolt lock washers 164 and bolt nut 166.

Figure 2:
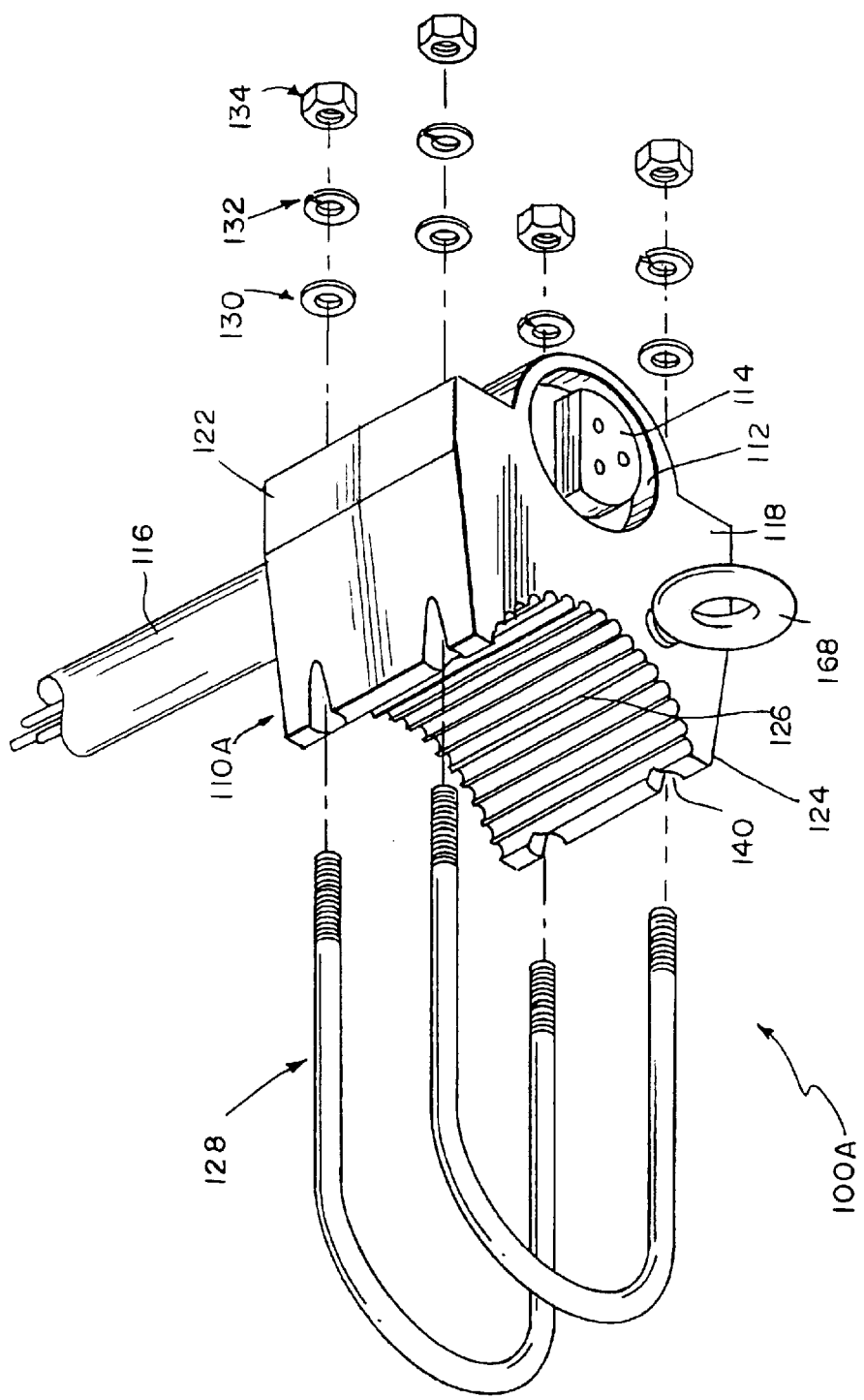
FIG. 2 is an exploded view of an embodiment of a mounting block assembly where U-bolts extend through openings in the side surface of the housing, according to the principles of the present invention.

Another embodiment, mounting block assembly 100A, is shown as FIG. 2. This mounting block assembly, 110A, differs from mounting block assembly 100 in FIG. 1 in that housing 110A is secured to, for instance, a portion of a brake pipe air valve (See FIG. 1) by U-bolts 128 through holes 140 in the side surface 124 of the housing 110A. Another difference is that housing 110A has an arcuate frictional surface 126 formed as part of a side surface 124 of the housing 110A to provide additional security through resistance to the movement of the housing 110A when it is secured to a portion of the brake pipe air valve 188. Another difference is that the receiving means of housing 110A is a ring 168 (or the "eye" portion of an eyebolt or equivalent) cast as an integral part of the housing 110A.

Figure 3:
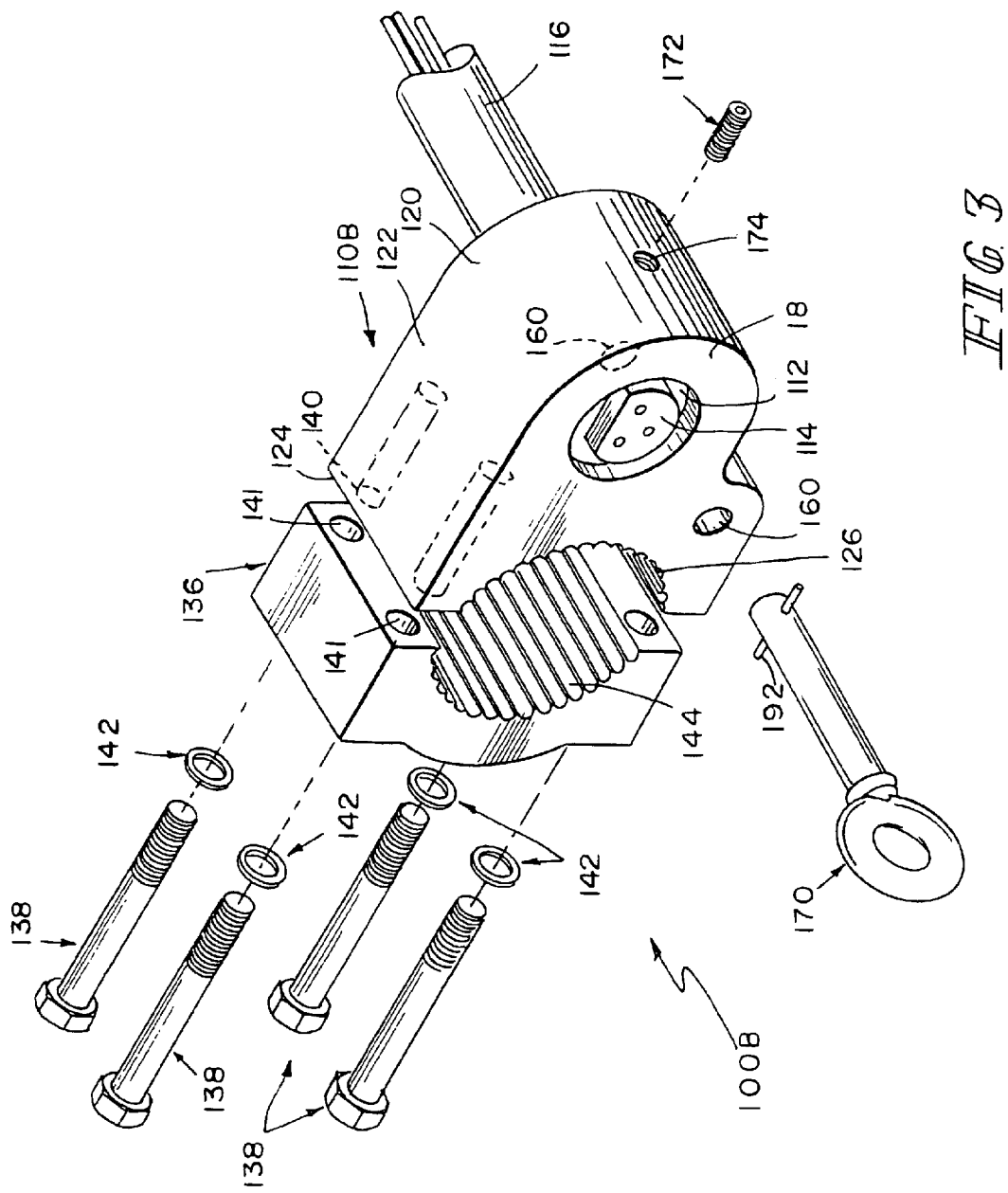
FIG. 3 is an exploded view of an embodiment of a mounting block assembly where a C-clamp is secured through openings in the side surface of the housing, according to the principles of the present invention.

Yet another embodiment, mounting block assembly 100B, is shown in FIG. 3. This mounting block assembly, 100B, differs from mounting block assembly 110 in that housing 110B is secured to, for instance, a portion of a break pipe air valve via C-clamp 136. The C-clamp is secured by C-clamp bolts 138 and C-clamp washers 142 with the bolts 138 extending through holes 141 in the C-clamp 136. The bolts 138 are threaded into holes 140 in the side surface 124 of the housing 110B. The C-clamp 136 has an arcuate frictional surface 144 to provide additional security for resistance to the movement of the housing 110B when it is secured to a portion of a break pipe air valve (see FIG. 1 for the air valve). Another difference is the receiving means, which in housing 110B is a snap-pin and ring 170 inserted through the bolt opening 160 in the front surface 118 of the housing 110B and exiting at the rear surface 120. The snap-pin spring tips 192 snap the pin and ring 170 securely into place.

Figure 4A:
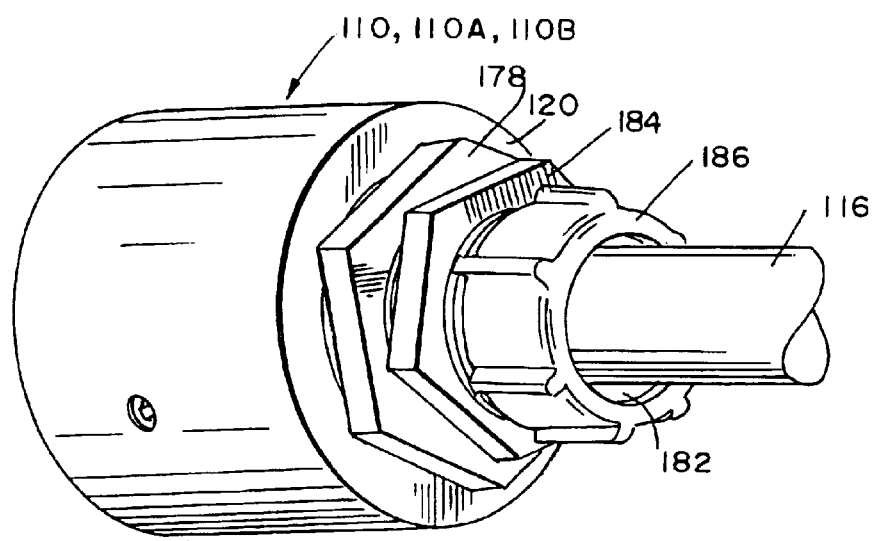
FIG. 4a is a perspective view of a mounting block assembly housing showing the assembled strain relief mechanism.
Figure 4B:
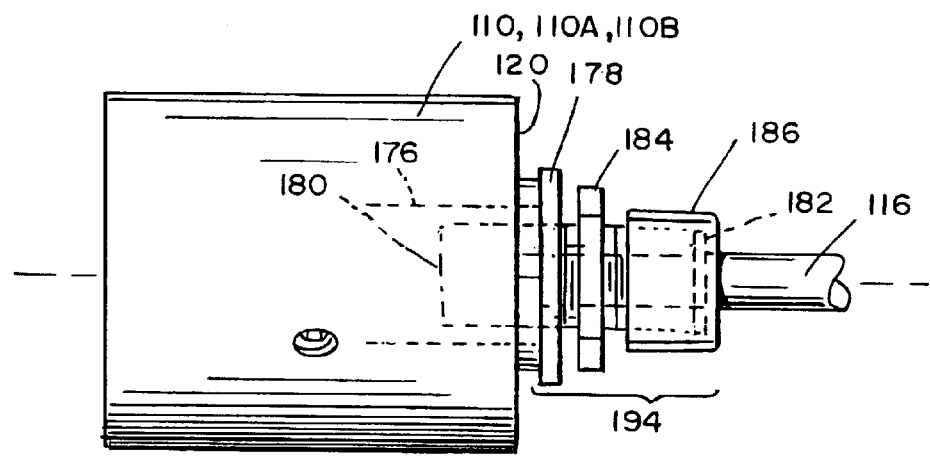
FIG. 4b is an exploded view of the strain relief mechanism.

FIGS. 4A and 4B show that each of the mounting block assembly housings 110, 110A, 110B may have a strain relief mechanism 194 attached adjacent to the rear surface 120 of the housings 110, 110A, 110B. A strain relief mechanism 194 may also be included on housings 110C, 110D, (shown in FIGS. 5–6). The housings 110, 110A through 110D are constructed such that the threaded opening 112 is of a size which does not directly correlate with the standard size opening required for a strain relief mechanism 194. Consequently, a first threaded tube 176 can be attached to the threaded opening 112 at the rear surface 120 in each of the housings 110, 110A through D and secured in place via first hex nut 178. This enables a strain relief mechanism 194 to be attached to the housings. Alternatively, the housings could have a double-bored threaded opening (not shown) to directly accommodate the strain relief mechanism 194. The strain relief mechanism 194 protects the electrical cable 116 and may be comprised of a second threaded tube 180 that is threadably inserted into the first threaded tube 176 and secured by a second hex nut 184. The strain relief mechanism 194 may further comprise a rubber bushing 182 that is secured in place around the electrical cable 116 by a threaded sleeve 186, thereby providing the strain relief for the electrical cable 116.

The arcuate frictional surfaces 126, 144 referred to above in the embodiments can, alternatively, be just arcuate surfaces having no corrugations or equivalent frictional surface attributes (not shown). Moreover, the surfaces of the U-bolts can be frictional surfaces or surfaces having no corrugations or equivalent frictional surface attributes (not shown).

Figure 5:
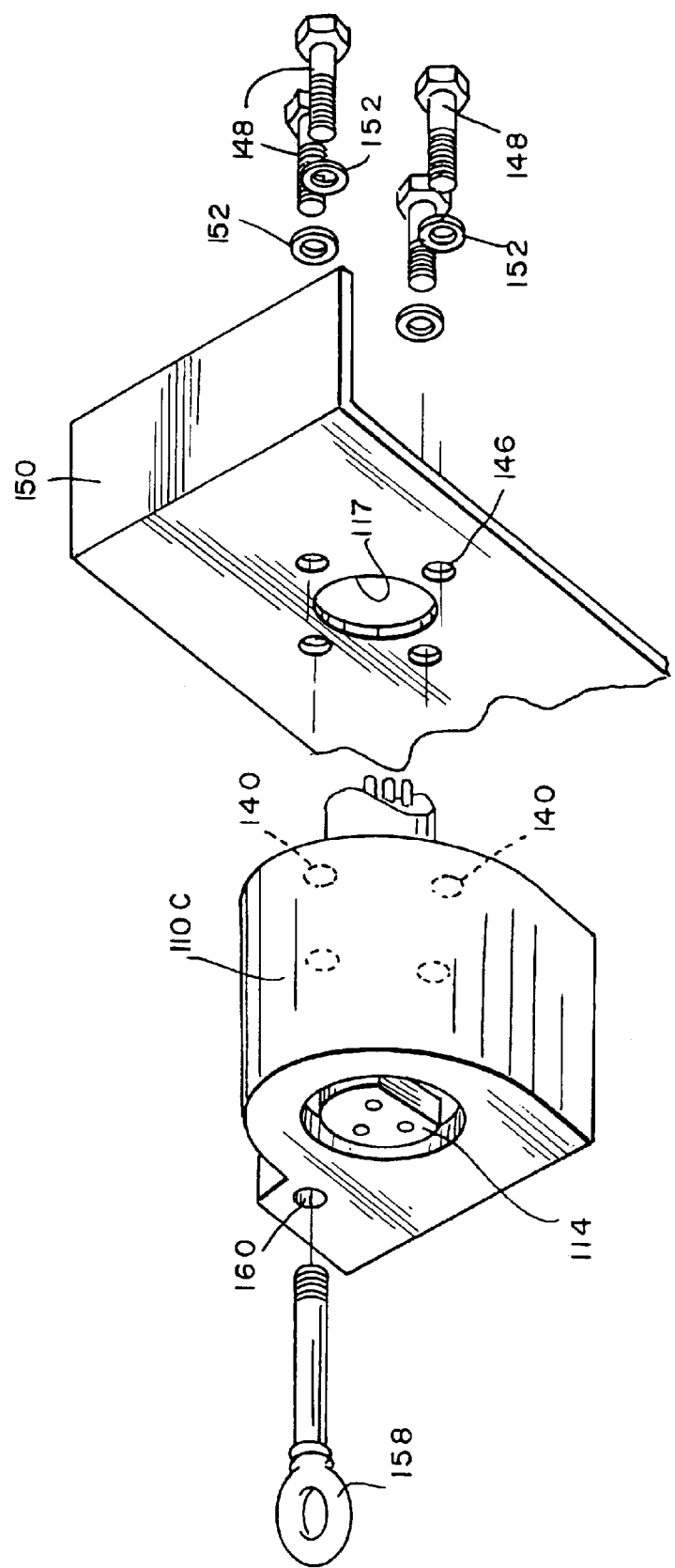
FIG. 5 is an exploded view of an embodiment of a mounting block assembly housing, mounted on a mounting plate of a rail car, according to the principles of the current invention.

FIG. 5 shows another embodiment, mounting block assembly housing 110C, that is mounted on a mounting plate 150 adjacent an air valve mounted at the end of a rail car. The housing 110C is secured by four washers 152 and four bolts 148 that are inserted through the plate holes 146 and into the holes 140 of the housing 110C. The plate 150 has an opening 117 to accommodate an electrical cable (not shown here, but see FIG. 4a). Alternatively, the housing 110C may be mounted on a plate that also contains an air valve or it may be mounted on a plate adjacent to the plate that contains an air valve.

Figure 6:
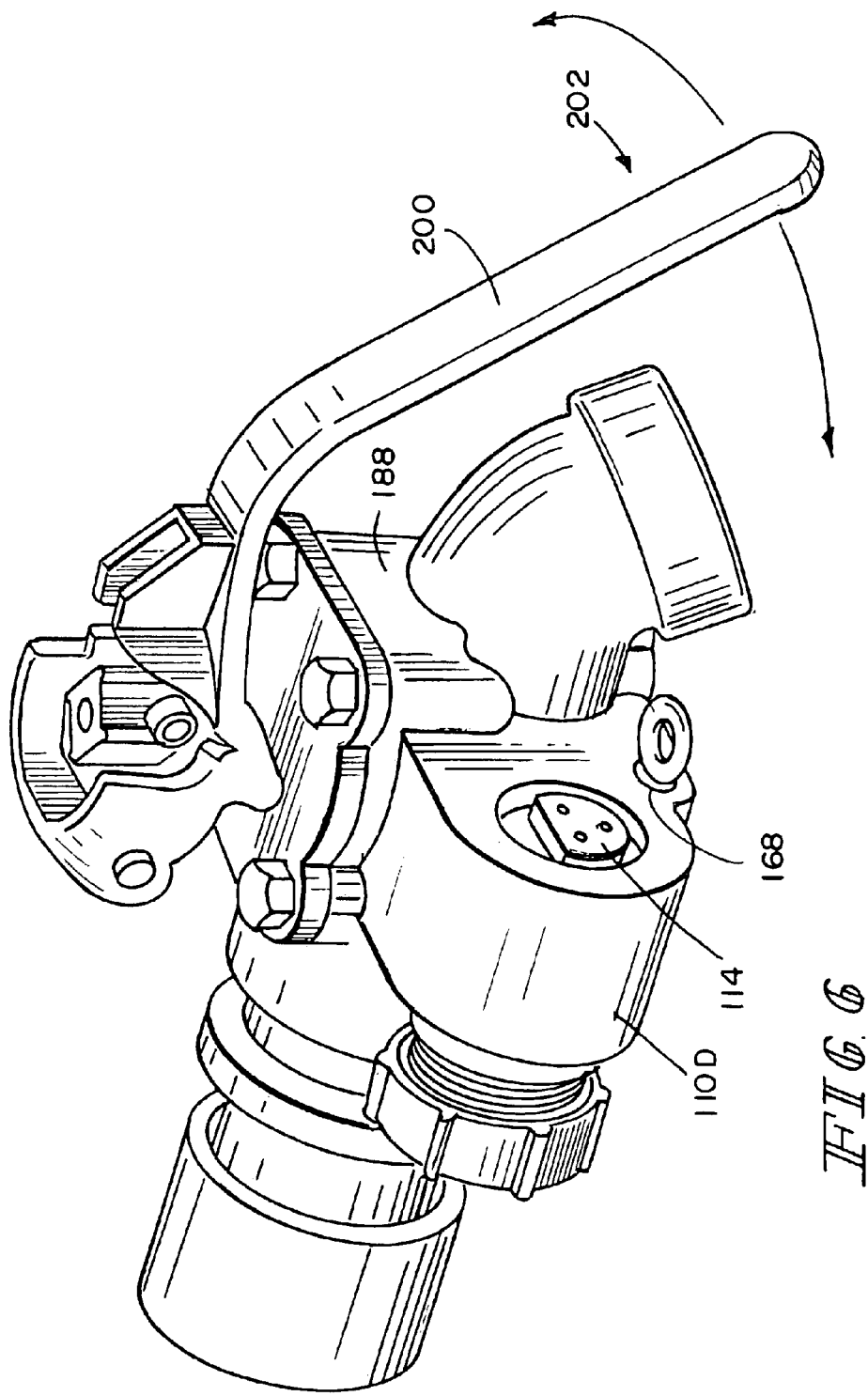
FIG. 6 is a perspective view of an embodiment of a mounting block assembly housing and an air valve made as a monolithic unit, according to the principles of the present invention.

FIG. 6 shows another embodiment, mounting block assembly 110D, where the housing 110D and an air valve 188 are a monolithic unit, made, for instance, by casting. Thus, the housing 110D is cast onto the air valve 188 in such a way as to permit the handle 200 to be rotated in a horizontal plane 202 so that a person's hand will clear the housing 110D and the housing 110D will not interfere with the operation of the handle 200 The location of the housing 110D is closer to the handle 200 than in the mounted embodiments of FIGS. 1–5.

FIG. 7 shows a specially-designed lanyard 400 constructed to encompass an electrical cable 520 (See FIG. 8 for the cable). The length of the strap 420 of the lanyard 400 can be, preferably, shorter than the length of the electrical cable 520. Thus, the lanyard 400 can prevent strain on the cable 520 if the rail cars separate. The separating force required to separate the rail cars is less than the strength of the lanyard material and connections. FIG. 7 illustrates the lanyard 400 which comprises a strap 420 of a fixed or adjustable length having a first end 422 and a second end 424 with a first connector 426 at the first end 422 and a second connector 428 at the second end 424. The adjustable length can be accomplished by the use of buckles (not shown) or other equivalent means. The connectors 426, 428 are shown as secured to the end of the straps by stitching, but other methods of attachment may be used. The lanyard 400 has a plurality of material loops 432, shown here as sewn to the strap 420 along the length of and extending outwardly from the strap 420. The material loops may also be riveted to the strap 420 (see FIG. 8) or attached by other equivalent means.

The lanyard loops 432 in FIGS. 7 and 434 in FIG. 8 prevent the cable 520 from getting tangled or hitting the ground. The strap 420 may be made of a cloth of man-made fibers or made from one or more of KEVLAR, polypropylene, nylon and polyester. The loops 432, 434 may be made of a fixed length or may be made of a material that allows for an adjustable length. The first connector 426, which can be a closed or open bolt, hook, or ring and is shown as a threaded eyebolt, connects to a receptable 526 (See FIG. 8) of an electrical cable 500 (See FIG. 8). The receptable 526 can be a threaded opening with a ring or can be a slot adapted to receive a connector or equivalent receiving device. The second connector 428, which can be an open or closed hook or clasp or equivalent is shown as a snap-closing hook that connects to one of the receiving mechanism 158, 168, 170 that can be used in any of the housings 110, 110A–110D (shown in FIGS. 1–3, 5–7, 9, but not shown in FIGS. 7 and 8).

FIG. 8 shows a lanyard in combination with an electrical cable 500. This combination 500 is comprised of an electrical cable 520 of a first length 528 and a strap 420 of a second length 436. The second length 436 is preferably shorter than the first length 528. The strap 420 has a plurality of loops 434, shown here as riveted to the strap 420, that encompass portions of the electrical cable 520 to restrain and keep the electrical cable 520 from getting tangled with other cables, hoses or wires and from dangling and hitting the ground. The strap 420 also has a first connector 426, which can be a closed or open hook or ring or equivalent and shown here as an eyebolt that is attached to a receptacle 526. Strap 420 also has a second connector 430 which can be a closed or open hook or clasp or equivalent, but is shown here as an open hook that is used to connect a lanyard strap 420 to a receiver 158, 168, 170 (See FIGS. 1–3, 5–7, 9) of a housing 110, 110A D (housing receivers are not shown in FIGS. 7 and 8). The electrical cable 520 has a first electrical connector 522 that connects to an "inter-car" electrical connection (not shown but well-known in the art, see for example, U.S. Pat. No. 6,138,715) that is used for electrical connections between rail cars. The second electrical connector 524 connects to the electrical plug 114 of a housing 110, 110A–D (see FIGS. 1–3, 5–7, 9).

The loops 432, 434 can be made of any type of adjustable material such as hook and loop, but can also be made to be adjustable with the use of a buckle or equivalent adjustable device. The loops 432, 434 can be of a fixed length as well. When the loops are of a fixed length, the electrical cable 520 must arrive for assembly with at least one if not both of its connectors 522, 524 separated from the cable 520. After inserting the cable 520 without the connectors 522, 524 through the loops 432, 434, the connectors 522, 524 can be attached to the cable 520. When the loops 432, 434 are made of adjustable material and can be opened partially or completely, then the electrical cable 520 can come with its connectors 522, 524 attached. The electrical cable 520 can then be laid onto the open loops and the loops closed over the cable 520.

Figure 9:
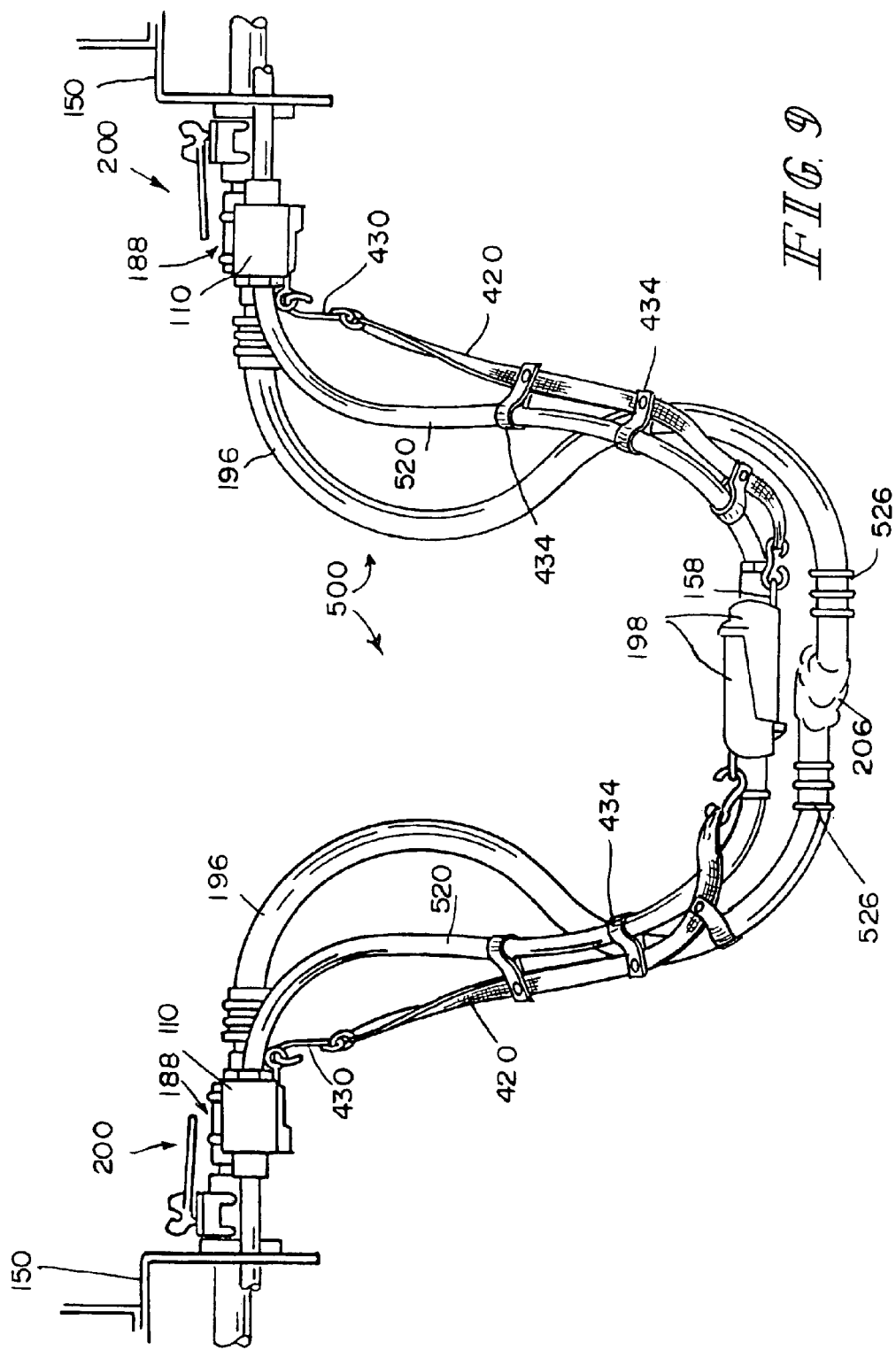
FIG. 9 is a perspective view of a lanyard and electrical cable mounted on an air valve that is to be mounted on the end of a rail car.

FIG. 9 illustrates the mounting of a lanyard and cable in combination 500 with the cable 520 encompassed by the lanyard's loops 432, 434. It also shows the shorter length of the lanyard strap 436 in comparison with the longer length of the electrical cable 528 (See also FIG. 8). The electrical cables 520 are connected between cars by an inter-car electrical connection 198. The lanyard strap eyebolt connector 158 is inserted into the receptable 526 on the electrical cable 520. The other end of the strap 420 has its connector 430 attached to the eyebolt 158 of the housing 110. The lanyard loops 432, 434 restrain the electrical cable 520 and hold it in place. The mounting block assembly housing 110 is shown mounted to the air valve 188 which is connected to the air hose 196. See also FIG. 1 for another view of how U-bolts 128 secure the housing 110 to the air valve 188. The shorter length of the lanyard strap 436 prevents the electrical cable 528 from coming under undue tension should the train cars come apart. That is because the air hose connection 206 and inter-car electrical connector 198 will come apart under less force than it takes to pull the lanyard strap 436 from the receptable 526 of the electrical connector 522.

It should be noted that any of the referenced securing mechanisms or means for receiving a connector may be used interchangeably on any or all of the embodiments described herein.

Although the present invention has been described and illustrated in detail it is to be clearly understood that the same is by way of illustration and example only and is not to be taken by way of limitation. The spirit and scope of the present invention are to be limited only by the terms of the appended claims.

What is claimed:

1. An end of car mounting block assembly for electrical interconnections between rail cars, comprising:
   a housing having an opening therethrough adapted to receive an electrical plug and an electrical cable;
   a plurality of bolt holes attaching the housing to a plate mounted on an end of a rail car, the plate having an opening therethrough coaxial with the housing opening for receiving at least a portion of the electrical cable; and
   a means for receiving a connector of a lanyard.

2. The mounting block of claim 1, wherein the housing further comprises a strain relief mechanism to prevent stress on the electrical plug and the electrical cable.

3. The mounting block of claim 1, wherein the housing further comprise a restraining device to prevent movement of the electrical plug inside the housing.

4. The mounting block assembly of claim 1, wherein the means for receiving a connector is selected from a group consisting of a threaded eyebolt attached through a bolt opening in the housing, a snap-pin and ring attached through a bolt opening in the housing and a ring that is cast as an integral part of the housing.

5. The mounting block assembly of claim 1, wherein the opening adapted to receive an electrical plug and an electrical cable is independent of an air hose or a brake pipe connection.

6. The end of car mounting assembly of claim 1, wherein the through-opening of the housing is threaded.

7. An end of car mounting block assembly for electrical interconnections between rail cars, comprising:
   a housing having an opening therethrough adapted to receive an electrical plug and an electrical cable; and
   a plurality of bolt holes attaching the housing to a plate mounted on an end of a rail car, the plate having an opening therethrough coaxial with the housing opening for receiving at least a portion of the electrical cable.

8. An end of car mounting block assembly for electrical interconnections between rail cars, comprising:
   a housing having an opening therethrough adapted to receive an electrical plug and electrical cable;
   a means on said housing for receiving a connector of a lanyard, said means receiving said connector of said lanyard; and
   wherein the housing and an air valve to be mounted at the end of a brake pipe on a rail car are a monolithic unit.

9. The mounting block of claim 8, wherein the housing further comprises a strain relief mechanism to prevent stress on the electrical plug and the electrical cable.

10. The mounting block of claim 8, wherein the housing further comprise a restraining device to prevent movement of the electrical plug inside the housing.

11. The mounting block assembly of claim 8, wherein the means for receiving a connector is selected from a group consisting of a threaded eyebolt attached through a bolt opening in the housing, a snap-pin and ring attached through a bolt opening in the housing and a ring that is cast as an integral part of the housing.

12. An end of car mounting block assembly for electrical interconnections between rail cars, comprising:

a housing having an opening therethrough receiving a first electrical connection that forms an end of an electrical cable, and the first electrical connection being exposed at an end of the opening such that the first electrical connection is configured to mate with a second complementary electrical connector so as to form a plug and socket electrical connection; and wherein the housing and an air valve mounted at an end of a brake pipe on a rail car are a monolithic unit.

\* \* \* \* \*